(12) United States Patent
Wada et al.

(10) Patent No.: US 7,164,638 B2
(45) Date of Patent: Jan. 16, 2007

(54) OPTICAL HEAD AND OPTICAL RECORDING/REPRODUCING DEVICE USING IT AND ABERRATION CORRECTION METHOD

(75) Inventors: Hidenori Wada, Uji (JP); Yoshiaki Komma, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 274 days.

(21) Appl. No.: 10/502,242

(22) PCT Filed: Dec. 9, 2002

(86) PCT No.: PCT/JP02/12884

§ 371 (c)(1),
(2), (4) Date: Jul. 13, 2004

(87) PCT Pub. No.: WO03/075266

PCT Pub. Date: Sep. 12, 2003

(65) Prior Publication Data

US 2005/0078574 A1    Apr. 14, 2005

(30) Foreign Application Priority Data

Mar. 4, 2002    (JP)    .............................. 2002-056954

(51) Int. Cl.
    *G11B 11/03*    (2006.01)
(52) U.S. Cl. ................ 369/53.19; 369/112.23
(58) Field of Classification Search ............... None
    See application file for complete search history.

(56) References Cited

U.S. PATENT DOCUMENTS

| | | | |
|---|---|---|---|
| 5,699,340 A * | 12/1997 | Lee et al. ................ 369/53.19 |
| 5,920,532 A * | 7/1999 | Yagi et al. ................ 369/53.22 |
| 6,078,554 A | 6/2000 | Ootaki et al. | |
| 6,115,336 A | 9/2000 | Okada | |
| 6,125,088 A * | 9/2000 | Ogasawara ............... 369/44.32 |
| 6,141,304 A * | 10/2000 | Ogasawara ............... 369/53.19 |
| 6,259,665 B1 * | 7/2001 | Nagasato .................. 369/53.19 |
| 6,418,108 B1 * | 7/2002 | Ueda et al. ............ 369/112.23 |
| 6,498,330 B1 | 12/2002 | Yoshida | |
| 6,532,202 B1 * | 3/2003 | Wada et al. ........... 369/112.02 |
| 6,721,259 B1 | 4/2004 | Yamamoto et al. | |

(Continued)

FOREIGN PATENT DOCUMENTS

JP    10-334575    12/1998

(Continued)

*Primary Examiner*—Paul Huber
(74) *Attorney, Agent, or Firm*—Hamre, Schumann, Mueller & Larson, P.C.

(57) ABSTRACT

An optical head for recording/reproducing signals to/from a high-density multi-layer optical recording medium is provided, which is capable of performing stable recording and reproducing with an aberration in each layer being minimized even when the optical recording medium tilts. The optical head includes a light source (1), an objective lens (7) for focusing light emitted from the light source (1) on an optical recording medium (8), and an objective lens tilting means (13) for correcting an aberration that occurs when the optical recording medium (8) tilts. It is configured so as to vary a tilted amount through which the objective lens tilting means (13) tilts the objective lens according to information concerning a tilt of the optical recording medium (8) and information concerning a substrate thickness of the optical recording medium (8).

18 Claims, 9 Drawing Sheets

U.S. PATENT DOCUMENTS

| | | | |
|---|---|---|---|
| 6,791,934 B1 * | 9/2004 | Shimano et al. | 369/112.23 |
| 6,990,055 B1 * | 1/2006 | Nakamura et al. | 369/53.27 |
| 7,035,177 B1 * | 4/2006 | Matsuura | 369/44.32 |
| 7,035,186 B1 * | 4/2006 | Chung et al. | 369/53.22 |

FOREIGN PATENT DOCUMENTS

| | | |
|---|---|---|
| JP | 11-110802 | 4/1999 |
| JP | 11-312327 | 11/1999 |
| JP | 2000-20993 | 1/2000 |
| JP | 2000-131603 | 5/2000 |
| JP | 2000-171346 | 6/2000 |
| JP | 2000-34862 | 12/2000 |
| JP | 2001-84631 | 3/2001 |
| WO | 00/79525 | 12/2000 |

* cited by examiner

Tangential direction

Radial direction

OPTICAL HEAD AND OPTICAL RECORDING/REPRODUCING DEVICE USING IT AND ABERRATION CORRECTION METHOD

This application is a 371 of PCT/JP02/12884, filed Dec. 9, 2002.

TECHNICAL FIELD

The present invention relates to an optical head used for recording signals in an optical recording medium or reproducing signals recorded in the optical recording medium, an optical recording/reproducing device using the same, and a method for correcting an aberration that occurs when an optical recording medium is tilted.

BACKGROUND ART

Recently, a digital versatile disk (DVD) has drawn attention as a high-capacity optical recording medium, since it is capable of recording digital information at a recording density approximately six times that of a compact disk (CD). Further, with an increase in information to be recorded, a higher-density optical recording medium is demanded. Here, to achieve higher densification than that of a DVD (a light source in a DVD system has a wavelength of 660 nm, and an objective lens therein has a numerical aperture (NA) of 0.6), it is necessary to shorten the wavelength of the light source and increase the NA of the objective lens. For example, a recording density five times that of the DVD can be achieved by using a blue laser with a wavelength of 405 nm and an objective lens with a NA of 0.85.

However, in an optical recording/reproducing device of a high-density optical recording medium using the foregoing blue laser, margins in recording and reproducing are extremely narrow, and hence, the occurrence of an aberration due to a tilt of an optical recording medium becomes a problem. To cope with this, JP 11(1999)-312327A has proposed an optical head that is configured to carry out recording and reproducing by tilting an objective lens so as to decrease an aberration that occurs according to an amount of a tilt through which an optical recording medium tilts (such an amount of a tilt of an optical recording medium hereinafter is referred to as a tilting amount).

Here, an example of the above-mentioned conventional optical head is described with reference to a drawing. FIG. 11 is a schematic view illustrating a configuration of an optical head in the prior art. In FIG. 11, 111 denotes a light source, and for example, a semiconductor laser element is used as the light source 111. The light source 111 emits coherent light for recording/reproducing with respect to a recording layer of an optical recording medium 116. 112 is a collimator lens, which is a lens for converting divergent light emitted from the light source 111 into parallel light. 113 denotes a beam splitter, which is an optical element for splitting light incident therein. 114 denotes a mirror, which is an optical element that reflects incident light and directs the same toward the optical recording medium 116. 115 denotes an objective lens, which is a lens for focusing light on a recording layer in the optical recording medium 116. 118 denotes a lens holding member for holding the objective lens 115, and the lens holding member 118 also functions as an objective lens tilting means for tilting the objective lens 115. 119 denotes a tilt sensor, which is intended to detect a tilting amount of the optical recording medium 116. 123 denotes a tilt detecting circuit, and 125 denotes a tilt controlling circuit. The operation for controlling a tilt of the objective lens 115 is performed by the tilt sensor 119, the tilt detecting circuit 123, the tilt controlling circuit 125, and the lens holding member 118 functioning as the objective lens tilting means, so as to eliminate a tilt of the objective lens 115 relative to the optical recording medium 116. Further, 117 denotes a detection optical system, 120 denotes a focus error signal detecting circuit, 121 denotes a tracking error signal detecting circuit, 122 denotes a reproduction signal detecting circuit, and 124 denotes a controller.

Next, an operation of the optical head having the foregoing configuration is described with reference to FIG. 11.

Linearly polarized light emitted from the light source 111 is converted into parallel light by the collimator lens 112. The light thus converted into parallel light passes through the beam splitter 113, is reflected by the mirror 114, and is focused on the recording layer of the optical recording medium 116 by the objective lens 115.

The light reflected by the optical recording medium 116 passes through the objective lens 115, and is reflected by the mirror 114 and the beam splitter 113 successively. Then, it is guided from the detection optical system 117 to the focus error signal detecting circuit 120, the tracking error signal detecting circuit 121, and the reproduction signal detecting circuit 122, where a focus error signal, a tracking error signal, and a reproduction signal are detected, respectively. The focus error signal and the tracking error signal are detected by a known technique, for instance, the astigmatism method, the push-pull method, etc. Offset amounts are added to the detected focus error signal and tracking error signal by the controller 124 as required.

A focus controlling means (not shown) controls the position of the objective lens 115 in its optical axis direction according to the focus error signal so that the light is focused on the recording layer of the optical recording medium 116 in a well-focused state at all times. Further, a tracking controlling means (not shown) controls the position of the objective lens 115 in a radial direction of the optical recording medium 116 according to the tracking error signal so that light is focused on a desired track on the optical recording medium 116.

A tilt of the objective lens 115 relative to the optical recording medium 116 is detected by the tilt detecting circuit 123 via the tilt sensor 119 provided beside the objective lens 115. The tilt controlling circuit 125 feeds the lens holding member 118 with a signal for tilting the objective lens 115 according to the tilt signal from the tilt detecting circuit 123. With this operation, the objective lens 115 is tilted so that the tilt thereof relative to the optical recording medium 116 is eliminated.

Even with a tilt of the optical recording medium 116 relative to the objective lens 115, the foregoing configuration ensures a decrease in an aberration by detecting the tilting amount and tilting the objective lens 115, thereby allowing stable recording and reproducing to be conducted.

However, the optical head with the foregoing configuration cannot be used for a multi-layer optical recording medium in which information is recorded at a density higher than that in a DVD. For instance, assume a case in which recording and reproducing are carried out with respect to a single-layer optical recording medium with a substrate thickness of 0.1 mm and a multi-layer optical recording medium having a first layer with a substrate thickness of 0.08 mm and a second layer with a substrate thickness of 0.12 mm, by using a system whose light source has a wavelength of 405 nm and whose objective lens has an NA of 0.85. Here, the objective lens is designed so as not to cause a spherical aberration with respect to a substrate thickness of the single-layer optical recording medium. FIG. 3 illustrates the relationship between a tilting amount of the optical recording medium and a coma occurring in each layer thereof, as to the single-layer optical recording medium and the multi-layer optical recording medium (two-layer recording medium). As shown in FIG. 3, even with the same tilting amount of the optical recording medium, the amount of a coma varies with the substrate thickness. This implies that even with the same tilting amount of the optical recording medium, the amounts of tilts through which the objective lens are tilted (such an amount of a tilt of the objective lens hereinafter is referred to as a tilted amount) in the case where coma is corrected by tilting the objective lens differ from one another for the respective layers. Therefore, a problem occurs in open loop control such that not an aberration that occurs due to a tilt of an optical recording medium but a tilt of an optical recording medium is detected, and an objective lens is tilted according to the tilt.

DISCLOSURE OF THE INVENTION

The present invention was made in light of the above-described problems of the prior art, and it is an object of the present invention to provide an optical head for recording/reproducing a signal to/from a higher-density multi-layer optical recording medium, which is capable of performing stable recording and reproducing with an aberration in each layer being minimized even when the optical recording medium tilts. It is also an object of the present invention to provide an optical recording/reproducing device using the optical head, and a method for correcting an aberration that occurs when an optical recording medium tilts.

To achieve the foregoing object, an optical head according to the present invention is an optical head for recording a signal in an optical recording medium or reproducing a signal recorded in the optical recording medium, and the optical head includes: a light source; an objective lens for focusing light emitted from the light source on the optical recording medium; and a tilt-related-aberration correcting means for correcting an aberration that occurs when the optical recording medium tilts. The optical head is characterized in that a driving amount of the tilt-related-aberration correcting means is varied according to information concerning a tilt of the optical recording medium and information concerning a substrate thickness of the optical recording medium.

With this configuration of the optical head, it is possible to precisely correct an aberration that occurs due to a tilt of an optical recording medium even when recording and reproducing are carried out with respect to optical recording media with different substrate thicknesses, for instance, layers of a multi-layer optical recording medium, optical recording media of different types, and single-layer optical recording media having variation in their substrate thickness. Therefore, this makes it possible to perform stable recording and reproducing.

In the foregoing configuration of the optical head of the present invention, the tilt-related-aberration correcting means preferably is a means for tilting the objective lens. This preferable example does not cause an influence on the movement of the objective lens following an eccentricity of an optical recording medium, and is capable of correcting an aberration not only when light outgoes but also when light returns, thereby making it possible to perform stable recording and to obtain stable control signals and stable reproduction signals. Further, in this case, it is preferable that the objective lens has a certain set numerical aperture (NA), and a tilted amount of the objective lens is varied according to the substrate thickness of the optical recording medium.

In the foregoing configuration of the optical head of the present invention, the objective lens preferably has a NA of not less than 0.7. This preferable example makes it possible to widen a tolerance for a tilt of an optical recording medium even in the case of high densification that narrows margins as to aberrations in recording and reproducing. Therefore, this is suitable for the increase of the recording density.

Still further, the foregoing configuration of the optical head of the present invention preferably further includes a memory in which information concerning the driving amount of the tilt-related-aberration correcting means that is necessary for correcting an aberration that occurs due to a tilt of the optical recording medium is stored. The driving amount is determined according to the information concerning the tilt of the optical recording medium and the information concerning the substrate thickness of the optical recording medium. In the configuration, information concerning the driving amount of the tilt-related-aberration correcting means stored in the memory is retrieved according to the information concerning the tilt of the optical recording medium and the information concerning the substrate thickness of the optical recording medium, and the tilt-related-aberration correcting means is driven according to the retrieved information. This preferable example makes it possible to determine the driving amount of the tilt-related-aberration correcting means immediately.

Further, the foregoing configuration of the optical head of the present invention preferably further includes a tilt detecting means for detecting information concerning the tilt of the optical recording medium. This preferabe example allows information concerning the tilt of the optical recording medium to be detected precisely. Further, in this case, it is preferable that the tilt detecting means includes: a second light source different from said light source; a focusing lens for focusing light emitted from the second light source on the optical recording medium; and a photodetector for detecting light reflected by the optical recording medium. This preferable example allows an aberration occurring due to a tilt of the optical recording medium to be detected by an optical system separate from the optical system for recording and reproducing, whereby an aberration that occurs due to the tilt of the optical recording medium can be detected upon recording or reproducing concurrently. Further in this case, it is preferable that the tilt detecting means detects focus zero-crossing positions at two certain points in a radial direction of the optical recording medium, and detects a tilting amount of the optical recording medium based on a difference between values of a focus search voltage at the two points. The focus search voltage is a voltage for detecting the focus zero-crossing position. This preferable example does not require an optical system for detecting a tilt of the optical recording medium separately, thereby allowing the optical head to be downsized.

Still further, the foregoing configuration of the optical head of the present invention preferably further includes a memory in which information concerning the substrate thickness of the optical recording medium is stored. This preferable example does not require a means for detecting information concerning the substrate thickness of the optical recording medium, thereby allowing the optical head to be downsized.

Still further, the foregoing configuration of the optical head of the present invention preferably further includes a substrate thickness detecting means for detecting information concerning the substrate thickness of the optical recording medium. This preferable example allows information concerning the substrate thickness of the optical recording medium to be detected precisely. Further, in this case, it is preferable that the substrate thickness detecting means includes: a second light source different from said light source; a focusing lens for focusing light emitted from the second light source on the optical recording medium; and a photodetector for detecting light reflected by the optical recording medium. This preferable example allows an aberration occurring that relates to the substrate thickness of the optical recording medium to be detected by an optical system separate from the optical system for recording and reproducing, whereby an aberration that occurs relating to the substrate thickness of the optical recording medium can be detected upon recording or reproducing concurrently. Still further, in this case, it is preferable that the substrate thickness detecting means detects the information concerning the substrate thickness of the optical recording medium based on focal positions of two light beams. The two light beams are a first light beam on a side closer to an optical axis and a second light beam on an external side as compared with the first light beam. This preferable example does not require an optical system for detecting the substrate thickness of the optical recording medium separately, thereby allowing the optical head to be downsized.

Still further, in the foregoing configuration of the optical head of the present invention, it is preferable that the tilt-related-aberration correcting means is formed with an optical element. The optical element includes a pair of substrates having transparent conductive thin films, respectively, and a phase shifting layer interposed between the pair of substrates. A pattern capable of correcting an aberration that occurs due to the tilt of the optical recording medium is formed on one of the conductive thin films. This preferable configuration makes it possible to omit all the members necessary for tilting the objective lens, thereby allowing the optical head to be downsized. Still further, in the case where this scheme is used, only a coma occurs, unlike the case where the objective lens is tilted. Therefore, the aberration can be corrected excellently. In this case, it further is preferable that the phase shifting layer is made of liquid crystal. This preferable example decreases the voltage applied from outside for correcting the aberration, thereby reducing the power requirements of the optical head.

Still further, the foregoing configuration of the optical head of the present invention preferably further includes a substrate-thickness-related-aberration correcting means for correcting an aberration that occurs due to a deviation of the substrate thickness of the optical recording medium from a standard value of the substrate thickness. Further, in this case, it is preferable that the substrate-thickness-related-aberration correcting means includes: a positive lens group and a negative lens group disposed in an optical path; and a means for varying a lens distance between the positive lens group and the negative lens group. This preferable example makes it possible to correct an aberration that occurs relating to the substrate thickness of the optical recording medium, not only when light outgoes but also when light returns, thereby making it possible to perform stable recording and to obtain stable control signals and stable reproduction signals. Further, in this case, it is preferable that the substrate-thickness-related-aberration correcting means is formed with an optical element. The optical element includes a pair of substrates having transparent conductive thin films, respectively, and a phase shifting layer interposed between the pair of substrates. A pattern capable of correcting an aberration that occurs relating to the substrate thickness of the optical recording medium is formed on one of the conductive thin films. This preferable example makes it possible to omit all of the positive lens group, the negative lens group, and the means for varying a lens distance between the positive lens group and the negative lens group, thereby allowing the optical head to be downsized. In this case, it further is preferable that the phase shifting layer is made of liquid crystal. Further, in this case, it is preferable that the tilt-related-aberration correcting means and the substrate-thickness-related-aberration correcting means are formed with one optical element. The optical element includes a pair of substrates having transparent conductive thin films, respectively, and a phase shifting layer interposed between the pair of substrates. A pattern capable of correcting an aberration that occurs relating to the substrate thickness of the optical recording medium is formed on one of the conductive thin films. A pattern capable of correcting an aberration that occurs due to the tilt of the optical recording medium is formed on the other conductive thin film. This preferable example makes it possible to, using one optical element, correct a coma that occurs due to a tilt of the optical recording medium and a spherical aberration that occurs relating to the substrate thickness of the optical recording medium at the same time. Therefore, by incorporating the optical element in the optical head, the optical head can be downsized. In this case, it further is preferable that the phase shifting layer is made of liquid crystal.

Further, an aberration correcting method according to the present invention is a method for correcting an aberration that occurs when an optical recording medium tilts, by using an optical head for recording a signal in the optical recording medium or reproducing a signal recorded in the optical recording medium. The optical head includes: a light source; an objective lens for focusing light emitted from the light source on the optical recording medium; and a tilt-related-aberration correcting means for correcting an aberration that occurs when the optical recording medium tilts. The method is characterized by including the step of driving the tilt-related-aberration correcting means according to information concerning a tilt of the optical recording medium and information concerning a substrate thickness of the optical recording medium.

Further, an optical recording/reproducing device according to the present invention is configured so as to include an optical head for recording a signal in an optical recording medium or reproducing a signal recorded in the optical recording medium, and it is characterized in that the optical head is the optical head of the present invention.

DESCRIPTION OF THE INVENTION

Hereinafter, the present invention will be described more specifically by way of Embodiments.

First Embodiment

Figure 1:
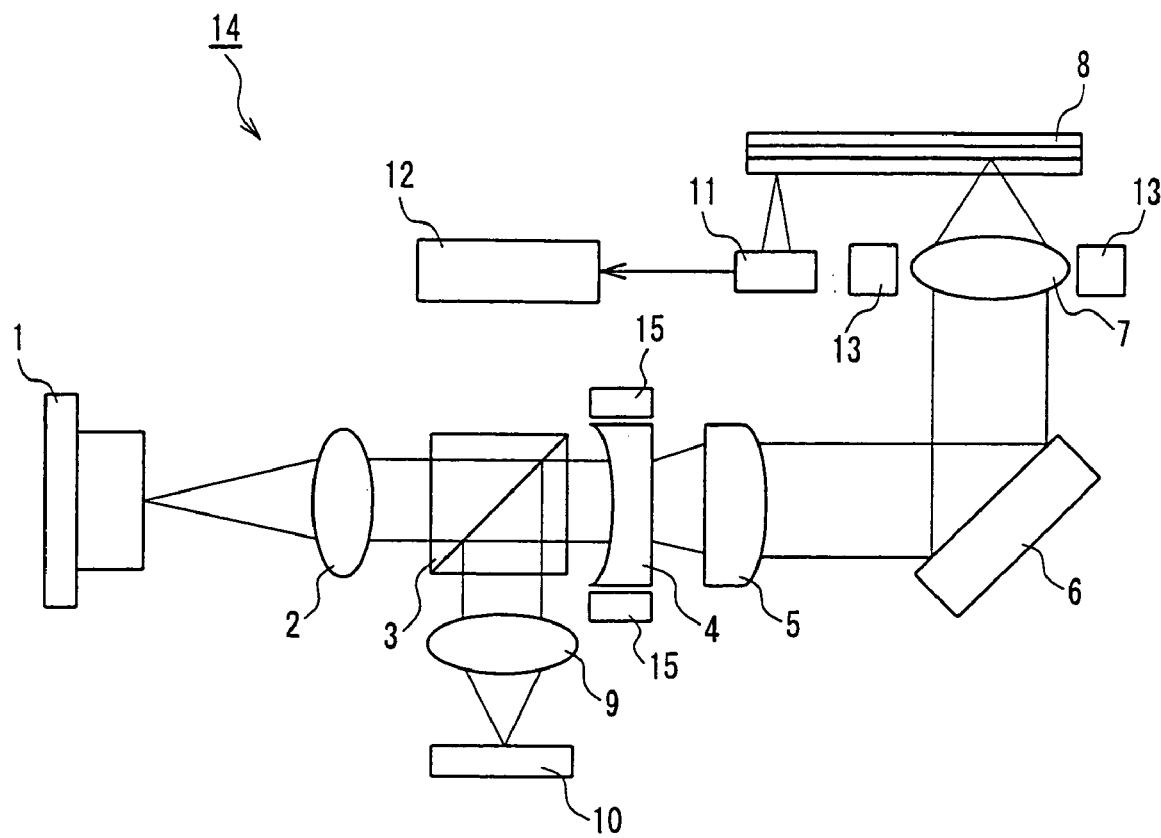
FIG. 1 is a schematic view illustrating an optical head according to a first embodiment of the present invention.

FIG. 1 is a schematic view illustrating an optical head according to a first embodiment of the present invention.

In FIG. 1, 1 denotes a light source, and a GaN-type semiconductor laser element (wavelength: 405 nm), for instance, is used as the light source 1. This light source 1 emits a coherent light for recording and reproducing to a recording layer of the optical recording medium 8. 2 denotes a collimator lens, and this collimator lens 2 is a lens for converting divergent light emitted from the light source 1 into parallel light. 3 denotes a beam splitter, and this beam splitter 3 is an optical element that transmits approximately 50% of light incident thereon and reflects approximately 50% of the same. 4 denotes a concave lens as a negative lens group, and this concave lens 4 is a lens intended to convert light that first has been converted into parallel light by the collimator lens 2 into divergent light again. 5 denotes a convex lens as a positive lens group, and this convex lens 5 is a lens for converting the light having been converted into divergent light by the concave lens 4 into parallel light again. 15 denotes a means for moving the concave lens 4 in its optical axis direction, and it is capable of varying a lens distance between the concave lens 4 and the convex lens 5 by moving the concave lens 4 in its optical axis direction. 6 denotes a mirror, and this mirror 6 is an optical element that reflects incident light and directs the same toward the optical recording medium 8 (a traveling direction of incident light being bent at 90°). 7 denotes an objective lens, and this objective lens 7 is a lens for focusing light on a recording layer of an optical recording medium 8. 13 denotes an objective lens tilting means as a tilt-related-aberration correcting means for correcting coma that occurs due to a tilt of the optical recording medium 8. 11 denotes a tilt sensor as a tilt detecting means, and this tilt sensor 11 is intended to detect a tilting amount of the optical recording medium 8. 12 denotes a memory, and information concerning a driving amount of the objective lens tilting means 13 that is necessary for correcting an aberration that occurs when the optical recording medium 8 tilts is stored in this memory 12. More specifically, tilted amounts of the objective lens 7 necessary for correcting aberrations that occur when the optical recording medium 8 tilts, regarding respective layers (regarding respective layers of a single-layer optical recording medium and a multi-layer optical recording medium), are stored in the memory 12. It should be noted that a ROM is used as the memory 12.

In the present embodiment, a substrate-thickness-related-aberration correcting means for correcting a spherical aberration that occurs due to a deviation of a substrate thickness from a standard value is composed of the concave lens 4, the convex lens 5, and the means for varying a lens distance between the concave lens 4 and the convex lens 5 (the means 15 for moving the concave lens 4 in its optical axis direction).

Further, 9 denotes a focusing lens, and 10 denotes a photodetector. Light reflected by the optical recording medium 8 is reflected by the beam splitter 3, and thereafter, it is collected by the focusing lens 9 so as to be focused on the photodetector 10. Then, it is converted into an electric signal by the photodetector 10.

Next, an operation of the optical head 14 having the foregoing configuration is described with reference to FIG. 1.

Linearly polarized light emitted from the light source 1 is converted into parallel light by the collimator lens 2. The light converted into parallel light is transmitted through the beam splitter 3, and then converted into divergent light by the concave lens 4. Thereafter, it is converted into parallel light again by the convex lens 5. Light converted into parallel light by the convex lens 5 is reflected by the mirror 6, and thereafter focused on a recording layer of the optical recording medium 8 by the objective lens 7.

The light reflected by the optical recording medium 8 is transmitted through the objective lens 7, and thereafter reflected by the mirror 6. The light reflected by the mirror 6 is transmitted through the convex lens 5 and the concave lens 4 successively, and thereafter, it is reflected by the beam splitter 3 and focused on the photodetector 10 by the focusing lens 9. The photodetector 10 outputs, according to the focused light, a focus error signal indicating a focused state of light on the recording layer of the optical recording medium 8 and a tracking error signal indicating a position at which light is projected thereon. Here, the focus error signal and the tracking error signal are detected by a known technique, for instance, the astigmatism method, the push-pull method, etc.

A focus controlling means (not shown) controls the position of the objective lens 7 in its optical axis direction according to the focus error signal so that the light is focused on the recording layer of the optical recording medium 8 in a well-focused state at all times. Further, a tracking controlling means (not shown) controls the position of the objective lens 7 in a radial direction of the optical recording medium 8 according to the tracking error signal so that light is focused on a desired track on the optical recording medium 8. Further, information recorded in the optical recording medium 8 also is obtained from the photodetector 10.

Figure 4:
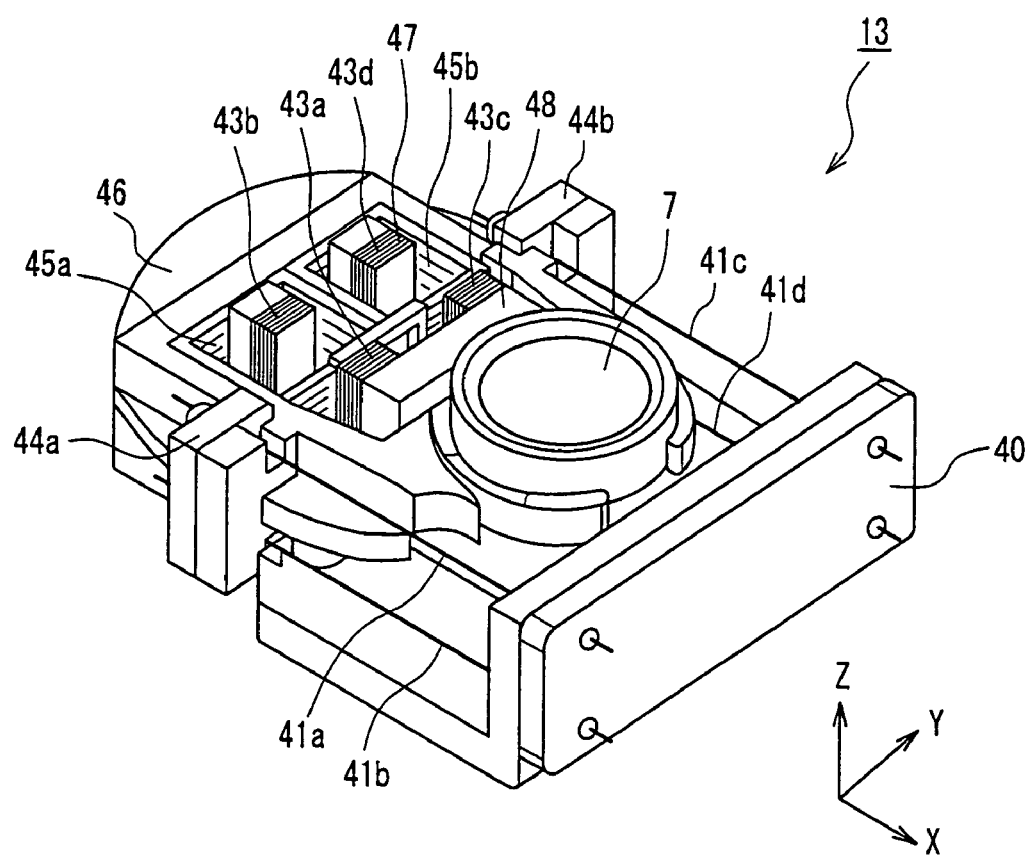
FIG. 4 is a perspective view illustrating a configuration of an objective lens tilting means as a tilt-related-aberration correcting means used in an optical head according to the first embodiment of the present invention.

Next, a specific configuration of the objective lens tilting means 13 as the tilt-related-aberration correcting means for controlling the tilt of the objective lens 7, and operations of the same are described below. FIG. 4 is a perspective view illustrating a configuration of the objective lens tilting means. This is disclosed by JP 11(1999)-312327 A, in which 40 denotes a suspension-attached substrate, 41a to 41d denote suspensions, 43a to 43d denote magnets, 44a and 44b denote small substrates, 45a and 54b denote focus coils, 46 denotes a lens holding member, 47 denotes a tracking coil, and 48 denotes a yoke. It should be noted that in FIG. 4, the Z-axis direction indicates a focusing direction, while the Y-axis direction indicates a tracking direction. In the objective lens tilting means 13 thus configured, when current flows in focusing coils 45a and 45b, a driving force applied to the focusing coils 45a and 45b is generated due to the relationship with magnetic fluxes generated by the magnets 43a to 43d (Fleming's left-hand rule), and causes the objective lens 7 to be tilted. Therefore, by varying the current flowing through the focusing coils 45a and 45b, the tilt direction and the tilted amount of the objective lens 7 can be varied.

The tilting amount of the optical recording medium 8 is detected by the tilt sensor 11 provided beside the objective lens 7. The tilt sensor 11 is known, which is provided with a light source such as a LED, a focusing lens for focusing light emitted from the light source on the optical recording medium 8, and a photodetector for detecting (receiving) light having been reflected by the optical recording medium 8. This tilt sensor 11, for instance, is configured so that the photoreceptive area of the photodetector is divided into two as to form two photoreceptive parts and is set so that a difference between respective signals outputted from the photoreceptive parts when the optical recording medium 8 is not tilted becomes "0". When the optical recording medium 8 is tilted, the difference between respective signals outputted from the photoreceptive parts is not "0", and the direction in which and the degree to which the optical recording medium 8 is tilted are detected according to the value and the sign of the foregoing difference. The signal detected by the tilt sensor 11 is fed to the memory 12. The memory 12 outputs a signal corresponding to a tilted amount needed by the objective lens 7 according to the tilting amount of the optical recording medium 8 and a substrate thickness of a layer to be subjected to recording or reproducing in the optical recording medium 8. The objective lens tilting means 13 tilts the objective lens 7 through a necessary tilted amount according to the foregoing signal.

Next, the tilted amount of the objective lens is described.

Figure 2:
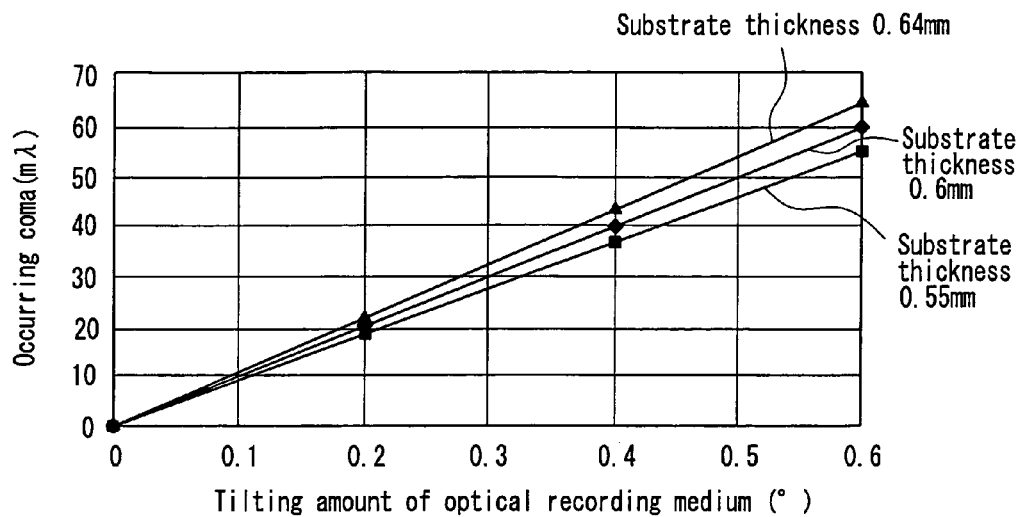
FIG. 2 is a graph showing the relationship between a tilting amount of an optical recording medium and an amount of a coma that occurs, regarding each layer of a single-layer optical recording medium and a two-layer optical recording medium in a DVD system.

First, a case of a DVD system having a light source with a wavelength of 660 nm and an objective lens with a NA of 0.6 is assumed. In the case of the DVD system, reproduction of a two-layer optical recording medium possibly is carried out. FIG. 2 illustrates the relationship between a tilting amount of an optical recording medium and an amount of coma that occurs due to the tilt, as to each layer of a single-layer optical recording medium and a two-layer optical recording medium in the DVD system. Here, the single-layer optical recording medium has a substrate thickness of 0.6 mm, a first layer of the two-layer optical recording medium has a substrate thickness of 0.55 mm, and a second layer of the same has a substrate thickness of 0.64 mm. Further, the objective lens is designed so as not to cause a spherical aberration with respect to the substrate thickness of the single-layer optical recording medium.

As shown in FIG. 2, in the DVD system, respective amounts of comas occurring for the various substrate thicknesses are different from one another slightly. However, the DVD system conducts only reproduction with respect to the two-layer optical recording medium, and hence has a large margin as to aberration. Therefore, in the case where a coma is corrected by tilting the objective lens, the DVD system is required only to tilt the objective lens through the same amount with respect to any one of the substrate thicknesses (any one of the layers).

Figure 3:
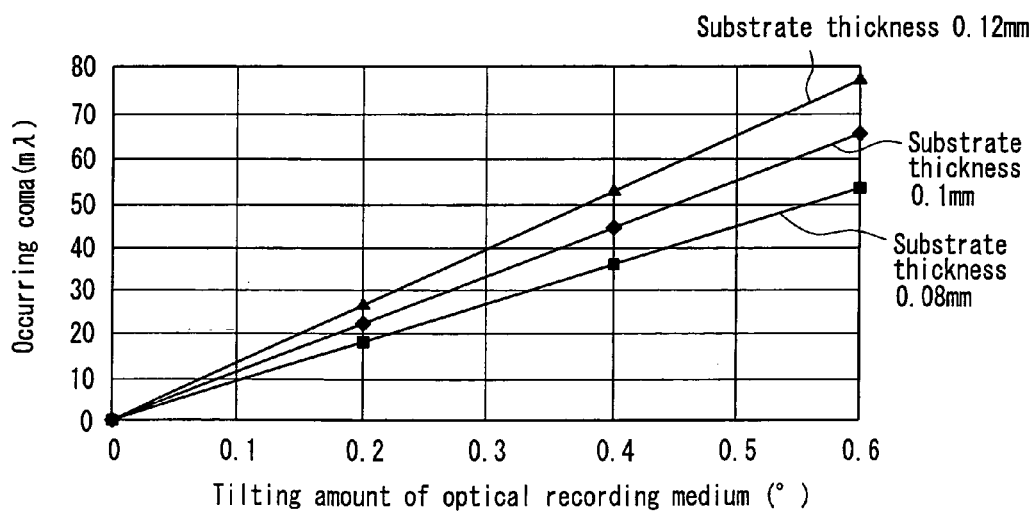
FIG. 3 is a graph showing the relationship between a tilting amount of an optical recording medium and an amount of a coma that occurs, regarding each layer of a single-layer optical recording medium and a multi-layer optical recording medium (two-layer optical recording medium) having a higher density than that of a DVD.

Next, a case is assumed in which recording or reproducing is carried out with respect to a multi-layer optical recording medium with a higher density than that of a DVD. For instance, a case is assumed in which recording or reproducing is carried out with respect to a single-layer optical recording medium with a substrate thickness of 0.1 mm and a multi-layer optical recording medium having a first layer with a substrate thickness of 0.08 mm and a second layer with a substrate thickness of 0.12 mm, by using a system whose light source 1 has a wavelength of 405 nm and whose objective lens 7 has an NA of 0.85. Here, the objective lens 7 is designed so as not to cause a spherical aberration with respect to a substrate thickness of the single-layer optical recording medium. FIG. 3 illustrates the relationship between the tilting amount of the optical recording medium and the coma that occurs due to the tilt, as to each layer of the single-layer optical recording medium and the multi-layer optical recording medium (two-layer recording medium), in the foregoing system.

As shown in FIG. 3, in the foregoing system, even with the same tilting amount of the optical recording medium 8, the amounts of coma occurring are different from one another, according to their substrate thicknesses. This implies that even with the same tilting amount of the optical recording medium 8, the tilted amounts of the objective lens 7 in the case where coma is corrected by tilting the objective lens 7 differ from one another for the respective layers.

Next, a case is assumed in which a two-layer optical recording medium includes a first layer with a substrate thickness of 0.08 mm and a second layer with a substrate thickness of 0.1 mm, equal to the substrate thickness of the single-layer optical recording medium. In this case, as shown in FIG. 3, amounts of comas occurring as to the respective substrate thicknesses with respect to the same tilting amount of the optical recording medium 8 are slightly greater than those in the case of a DVD system. However, since the recording density is greater than that in the DVD case and the system carries out the recording with respect to a multi-layer optical recording medium, margins as to aberrations are narrow as compared with the case of the DVD system. Therefore, even with the same tilting amount of the optical recording medium 8, the tilted amount of the objective lens 7 has to be varied with respect to the respective layers. This is particularly effective for a system in which an objective lens 7 has a NA of 0.7 or more, whose aberration margins as to recording and reproducing are narrow.

Next, an optical head is assumed that is capable of recording and reproducing with respect to any type of recording media, a CD and a DVD. In a CD system, an amount of an aberration occurring due to a tilt of an optical recording medium (CD) is relatively small since an NA of an objective lens is 0.45, which is small. Therefore, it is capable of carrying out a reproducing operation without tilting the objective lens, even if an optical recording medium (CD) tilts through, for instance, 0.5°. However, in a DVD system, an amount of an aberration occurring due to a tilt of an optical recording medium (DVD) is relatively great because an objective lens has a NA of 0.6. Therefore, if the optical recording medium (DVD) tilts through, for instance, 0.5°, it is necessary to tilt the objective lens through a certain degree as well. Therefore, in the case of an optical head capable of conducting a recording/reproducing operation with respect to any type of optical recording media, a CD and a DVD, even with the same tilting amount of the optical recording medium 8, the tilted amount of an objective lens for correcting an aberration in the case where the optical recording medium 8 is a CD is different from that in the case of a DVD. Thus, the optical head 14 according to the present embodiment is different from the foregoing optical head in that in the case where the objective lens 7 has a certain NA, even with the same tilting amount of the optical recording medium 8, the tilted amount of the objective lens 7 for correcting an aberration is varied according to the substrate thickness. Consequently, the optical head 14 of the present embodiment is different completely from an optical head configured so that the tilted amount of an objective lens for correcting an aberration is varied according to the NA, even with the same tilting amount of an optical recording medium.

Next, an operation of a substrate-thickness-related-aberration correcting means is described. In the case of an optical recording medium 8 having a higher density than that of the above-described DVD, a spherical aberration of 200 mλ occurs with respect to a substrate thickness of 0.08 mm, and this disables recording and reproducing operations. Therefore, it is necessary to correct this spherical aberration, and JP 2000-131603 A proposes a method for correcting a spherical aberration with a configuration in which two lenses, namely, a positive lens group and a negative lens group, are interposed in parallel light and a lens distance between the two lenses in an optical axis direction is varied so that the parallel light is converted into divergent light or converged light.

In the present embodiment, the correction of a spherical aberration is carried out by varying a lens distance between the concave lens 4 and the convex lens 5 with respect to the respective layers. Further, the memory 12 stores respective lens distances between the concave lens 4 and the convex lens 5 with respect to the layers, and when a recording or reproducing operation is conducted with respect to a certain layer, the concave lens 4 is moved in its optical axis direction so that the lens distance corresponding to the layer stored in the memory 12 is obtained.

As described above, when a recording/reproducing operation is carried out with respect to a multi-layer optical recording medium with a higher density, an aberration that occurs when an optical recording medium tilts can be corrected precisely by varying the tilted amount of an objective lens relative to the tilting amount of the optical recording medium for respective layers thereof, whereby a stable recording/reproducing operation can be performed.

Second Embodiment

Figure 5:
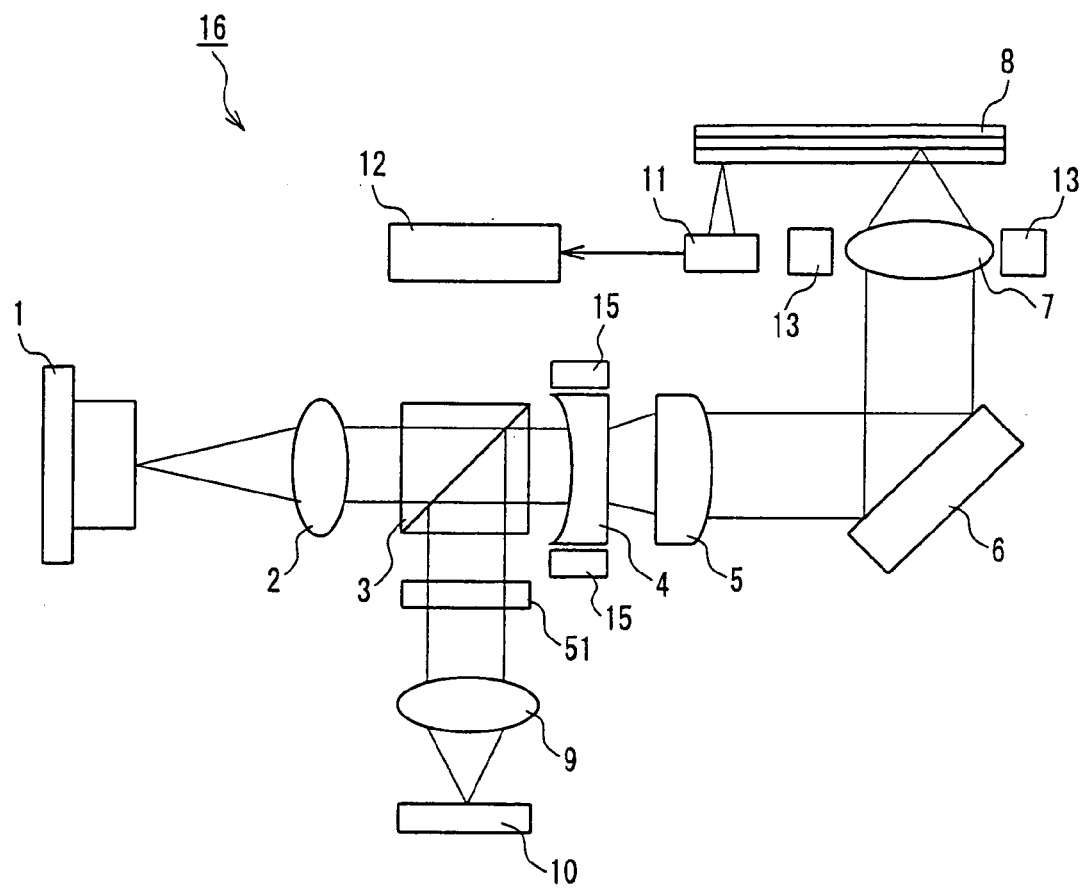
FIG. 5 is a schematic view illustrating an optical head according to a second embodiment of the present invention.

FIG. 5 is a schematic view illustrating an optical head according to a second embodiment of the present invention.

As shown in FIGS. 1 and 5, an optical head 16 (FIG. 5) of the present embodiment is different from the optical head 14 (FIG. 1) of the first embodiment described above only in that the optical head 16 includes a substrate thickness detecting means for detecting information concerning a substrate thickness of an optical recording medium 8, and the configuration of the optical head 16 except for the foregoing aspect is identical to that of the first embodiment. Therefore, herein the details of the present embodiment that are not specifically described are considered to be identical to those of the first embodiment described above, and the constituent members denoted with the same reference numerals as those in the first embodiment are considered to have the same functions as those of the first embodiment unless they are described specifically.

In FIG. 5, 51 denotes a hologram disposed between a beam splitter 3 and a focusing lens 9, and this hologram 51 has different patterns in an inner radius area and in an outer radius area.

Next, an operation of the optical head 16 having the foregoing configuration is described, with reference to FIG. 5.

The operation is identical to the operation of the first embodiment described above until linearly polarized light emitted from a light source 1 is focused on a recording layer of an optical recording medium 8 by an objective lens 7, and until light reflected by the optical recording medium 8 is reflected by the beam splitter 3. Therefore, the description of the operation is omitted herein.

The light reflected by the beam splitter 3 is incident on the hologram 51, and is split into two light beams, one from the inner radius area and the other from the outer radius area. The split light is focused on a photodetector 10 by a focusing lens 9. The photodetector 10 outputs, according to the focused light, a focus error signal indicating a focused state of light on the recording layer of the optical recording medium 8 and a tracking error signal indicating a position at which light is projected thereon. Here, the focus error signal and the tracking error signal are detected by a known technique, for instance, the astigmatism method, the push-pull method, etc.

A focus controlling means (not shown) controls the position of the objective lens 7 in its optical axis direction according to the focus error signal so that the light is focused on the recording layer of the optical recording medium 8 in a well-focused state at all times. Further, a tracking controlling means (not shown) controls the position of the objective lens 7 in a radial direction of the optical recording medium 8 according to the tracking error signal so that light is focused on a desired track on the optical recording medium 8. Further, information concerning the substrate thickness of the optical recording medium 8 and information recorded in the optical recording medium 8 also are obtained from the photodetector 10.

Next, the substrate thickness detecting means is described. The substrate thickness detecting means used in the present embodiment is that disclosed by JP 2000-171346 A. This substrate thickness detecting means divides, using the hologram 51, the reflected light from the optical recording medium 8 into a first light beam on a side closer to the optical axis and a second light beam on an external side as compared with the first light beam, and detects a spherical aberration according to focal positions of the foregoing two light beams that have entered and left the objective lens (a spherical aberration thus found can be converted to a substrate thickness of the optical recording medium 8). The signal detected is sent to the memory 12, and an objective lens tilting means 13 tilts the objective lens 7 through a necessary amount according to the foregoing signal.

Next, the tilted amount of the objective lens is described.

Tilted amounts of the objective lens 7 for the respective layers are stored in the memory 12 preliminarily. However, the substrate thickness of each of the respective layers also varies due to errors during the manufacture of the optical recording medium 8, etc. For instance, assume that a first layer of a two-layer optical recording medium, whose standard substrate thickness is 0.08 mm, actually has a substrate thickness of 0.07 mm due to such errors during the manufacture. In this case, though a coma occurring when the optical recording medium 8 tilts through 0.5° is 44 mλ with respect to the substrate thickness of 0.08 mm, such a coma is 38 mλ with respect to the substrate thickness of 0.07 mm.

Therefore, unless the tilted amount of the objective lens 7 is not corrected according to the substrate thickness, the coma is either canceled insufficiently or corrected excessively. In the case of a high-density optical recording medium in particular, the margin for a tolerable aberration is narrow, and this makes the insufficient cancellation or the excessive correction a serious problem.

Therefore, the present embodiment is configured so that the substrate thicknesses of the respective layers of the optical recording medium 8 are monitored and the tilted amount of the objective lens 7 is corrected according to this substrate thickness. This allows the correction of an aberration by tilting the objective lens 7 to be performed precisely. Further, even if the optical recording medium 8 is a single-layer optical recording medium, its substrate thickness has errors during the manufacture as described above, and accordingly, reproduction signals can be obtained stably therefrom by detecting the substrate thickness and varying the tilted amount of the objective lens 7 according to the substrate thickness thus detected. Further, the use of this method enables stable recording. Still further, though the tilted amounts of the objective lens 7 for the respective layers are stored in the memory 12 in the optical head 16 of the present embodiment, the tilted amounts of the objective lens 7 for the substrate thicknesses may be stored instead.

Or alternatively, the memory 12 may store only a tilting amount of the optical recording medium 8, and a voltage corresponding to a tilted amount of the objective lens 7 necessary for correcting an aberration occurring when the optical recording medium 8 whose substrate thickness is equal to the standard value of a substrate thickness of a single layer tilts through the foregoing tilting amount. In this case, an effect identical to the foregoing can be achieved by using the following method. First, when a signal detected by a tilt sensor 11 is fed to the memory 12, a voltage necessary for tilting the objective lens 7 is outputted from the memory 12. Then, this voltage is supplied to a circuit including a variable resistor, and is divided according to a resistance of the variable resistor. A change in the resistance of the variable resistor according to a signal detected by the substrate thickness detecting means causes a change in the voltage supplied to the objective lens tilting means 13, whereby the tilted amount of the objective lens 7 is varied according to the information concerning the substrate thickness even if the tilting amount of the optical recording medium 8 remains unchanged. This configuration allows the same effect as above to be achieved only with the information concerning a certain substrate thickness being stored in the memory 12, and therefore, reduces the circuit scale of the memory 12.

Further, though a tilting amount of the optical recording medium 8 and a driving amount for driving the tilt-related-aberration correcting means for correcting an aberration that occurs due to the tilt (for instance, a tilted amount of the objective lens 7 tilted by the objective lens tilting means 13) is stored in the memory 12 in the optical head 16 of the present embodiment, a circuit may be used instead of the memory 12. The circuit is configured so that a voltage outputted therefrom is varied when information (voltage) concerning the substrate thickness of the optical recording medium 8 and information (voltage) concerning the tilt of the optical recording medium 8 are supplied thereto. This configuration is equivalent to the case where the relationship between the tilting amount of the optical recording medium 8 and the driving amount of the tilt-related-aberration correcting means is expressed by a formula, and the driving amount of the tilt-related-aberration correcting means is varied according to this formula. A factor of proportionality of the formula is varied according to the respective layers and substrate thicknesses of the multi-layer optical recording medium. Further, the factor of the foregoing relationship may be non-linear, and the non-linear factor may be varied.

Still further, though the optical head 16 of the present embodiment uses a ROM as the memory 12 for storing values of the tilted amounts of the objective lens 7 with respect to pieces of information concerning the tilting amounts and substrate thicknesses of the optical recording medium 8, it may incorporate a nonvolatile memory instead so that optimal data for each optical head can be determined and stored when the optical head is assembled. This configuration allows variations of optical heads during the manufacture to be taken into consideration, thereby improving the precision of the aberration correction. It further may incorporate a rewritable memory so as to perform the learning as to each optical recording medium, and store the information learned. This configuration allows variations of the optical recording medium also to be taken into consideration, thereby further improving the precision of the aberration correction.

As described above, in the case of a higher-density multi-layer optical recording medium, an aberration can be corrected precisely by detecting a substrate thickness of each layer and correcting a tilted amount of the objective lens 7 according to the substrate thickness, whereby stable recording and reproducing can be performed.

It should be noted that though the detection of information concerning the substrate thickness is carried out using the hologram 51 in the present embodiment, the detection may be carried out by another method. For instance, another substrate thickness detecting means is disclosed by JP 10(1998)-334575 A. The substrate thickness detecting means disclosed by the foregoing publication is composed of a light source, a first optical system for focusing (projecting) light emitted from the light source on an optical recording medium (measurement target), and a second optical system for guiding light reflected by the optical recording medium toward a photodetector (photoreceptive element). Here, the light source is composed of a laser, a LED, or a lamp, and each of the first and second optical system is composed of a convex lens, or a combination of a convex lens and a concave lens. In this configuration, with different substrate thicknesses, different signals are outputted from the photoreceptive element. The above-described method of the present embodiment is achieved by incorporating the hologram 51, and does not require a separate optical system for detecting the substrate thickness of the optical recording medium 8. Therefore, it is advantageous for reducing the size of the optical head 16. On the other hand, in the case of the method described here, an aberration that occurs relating to a substrate thickness of an optical recording medium is detected by an optical system separate from the optical system for recording and reproducing. Therefore, the method is capable of detecting an aberration that occurs relating to a substrate thickness of an optical recording medium at the same time upon recording or reproducing.

Figure 6:
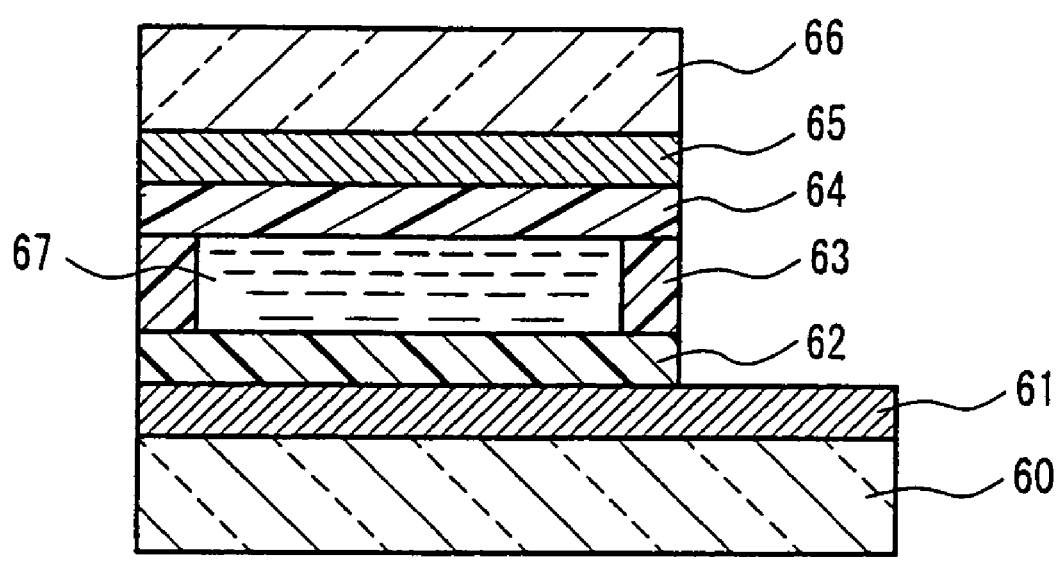
FIG. 6 is a cross-sectional view illustrating an optical element for correcting an aberration that occurs due to a tilt of an optical recording medium and an aberration that occurs relating to a substrate thickness of the optical recording medium in the second embodiment of the present invention.

JP 11(1999)-110802 A discloses a technique of correcting aberrations occurring due to two errors by using an optical element. The use of this technique allows an aberration that occurs due to a tilt of an optical recording medium and an aberration that occurs relating to a substrate thickness of the optical recording medium to be corrected using one optical element. FIG. 6 illustrates a cross section of the foregoing optical element.

Figure 7:
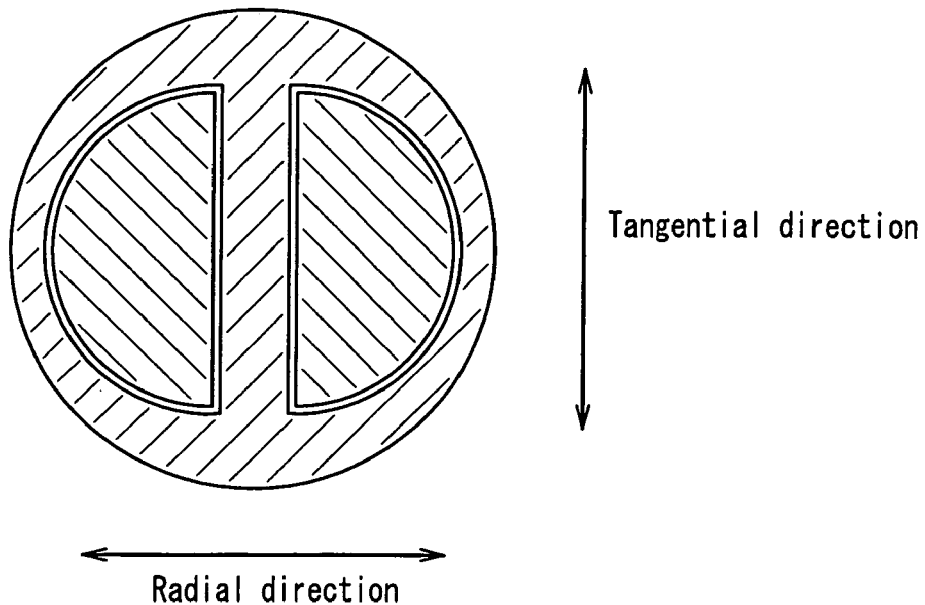
FIG. 7 is a view illustrating an electrode pattern used for correcting an aberration that occurs due to a tilt of an optical recording medium in the second embodiment of the present invention.
Figure 8:
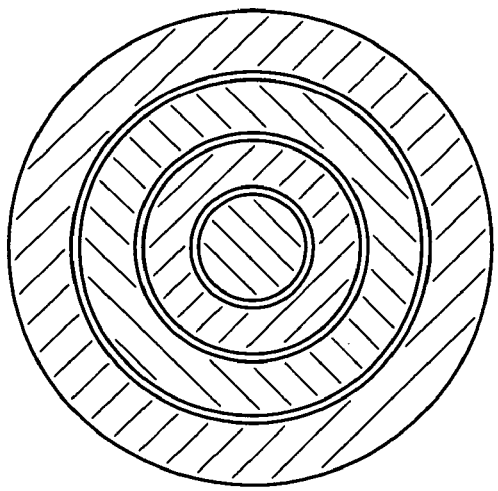
FIG. 8 is a view illustrating an electrode pattern for correcting an aberration that occurs relating to a substrate thickness of an optical recording medium in the second embodiment of the present invention.

In FIG. 6, 60 denotes a first glass substrate, 61 denotes a first ITO film (indium-tin-oxide alloy), 62 denotes a first polyvinyl alcohol film, 63 denotes an epoxy resin layer, 64 denotes a second polyvinyl alcohol film, 65 denotes a second ITO film, 66 denotes a second glass substrate, and 67 denotes liquid crystal. Here, the first ITO film 61 and the second ITO film 65 are deposited by vapor deposition on an inner-side surface of the first glass substrate 60 and an inner-side surface of the second glass substrate 66, respectively, and the first and second ITO films 61 and 65 are transparent electrodes that apply a signal from outside to the liquid crystal 67 and transmit light. The first polyvinyl alcohol film 62 and the second polyvinyl alcohol film 64 are deposited on the first ITO film 61 and the second ITO film 65, respectively. The first and second polyvinyl alcohol films 62 and 64 are alignment films for controlling the alignment of the liquid crystal 67, and have been subjected to the rubbing with a polymer cloth made of nylon or the like. The epoxy resin layer 63 functions as a sealing layer for preventing the liquid crystal 67 from leaking outside. The first ITO film 61 is patterned in a pattern as shown in FIG. 7 so as to be divided into three regions, for correcting a coma that occurs due to a tilt of the optical recording medium 8. The second ITO film 65 is patterned in a pattern as shown in FIG. 8 so as to be divided into four regions, for correcting a spherical aberration that occurs relating to a substrate thickness of the optical recording medium 8.

It should be noted that the optical element of the present embodiment functions as an aberration correcting element. In this case, the first ITO film 61 having thereon a pattern that can correct an aberration that occurs due to a tilt of the optical recording medium 8 functions as a first aberration correcting electrode, while the second ITO film 65 having thereon a pattern that can correct an aberration that occurs relating to a substrate thickness of the optical recording medium 8 functions as a second aberration correcting electrode. Further, the liquid crystal 67 is equivalent to a phase shifting layer of the present invention. By applying desired voltages to the first ITO film 61 and the second ITO film 65, a coma that occurs due to a tilt of the optical recording medium 8 and a spherical aberration that occurs relating to a substrate thickness of the optical recording medium 8 can be corrected at the same time. Therefore, by incorporating this optical element in the optical head, it is possible to omit all of the concave lens 4, the convex lens 5, the means for varying a lens distance between the concave lens 4 and the convex lens 5 (the means 15 for moving the concave lens 4 in its optical axis direction), and members necessary for tilting the objective lens 7, whereby the downsizing of the optical head 16 can be achieved.

It should be noted that though the first and second embodiments described above employ the concave lens 4, the convex lens 5, and the means for varying a lens distance between the concave lens 4 and the convex lens 5 (the means 15 for moving the concave lens 4 in its optical axis direction) to compose the substrate-thickness-related-aberration correcting means, this substrate-thickness-related-aberration correcting means may be composed of a positive lens group and a negative lens group, as well as a means for varying a lens distance between the positive lens group and the negative lens group. Alternatively, the substrate-thickness-related-aberration correcting means may be composed with another scheme. For instance, a scheme employing liquid crystal as described above may be used. More specifically, the optical element shown in FIG. 6 modified by omitting the pattern of the first ITO film 61 may be used. Since the substrate-thickness-related-aberration correcting means in the first and second embodiments described above is formed using a lens, an aberration that occurs relating to a substrate thickness of the optical recording medium 8 can be corrected not only with respect to the outgoing light, but also with respect to the returning light. As a result, this enables stable recording, while it allows a stable control signal and a stable reproduction signal to be obtained also. On the other hand, in the case where an aberration that occurs due to a tilt of the optical recording medium 8 is corrected using the scheme described above, it is possible to omit all of the concave lens 4, the convex lens 5, the means for varying a lens distance between the concave lens 4 and the convex lens 5 (the means 15 for shifting the concave lens 4 in its optical axis direction), whereby the downsizing of the optical head can be achieved.

Still further, though the first and second embodiments employ the objective lens tilting means 13 as the tilt-related-aberration correcting means, the tilt-related-aberration correcting means may be formed using another scheme. For instance, a scheme employing liquid crystal as described above may be used. More specifically, the optical element shown in FIG. 6 modified by omitting the pattern of the second ITO film 65 may be used. Since the tilt-related-aberration correcting means of the first and second embodiments described above is intended to tilt the objective lens 7, it does not have an influence on the movement of the objective lens 7 associated with eccentricity of the optical recording medium 8, and further, an aberration can be corrected not only when light outgoes naturally, but also when light returns. As a result, this enables stable recording, while it allows a stable control signal and a stable reproduction signal to be obtained also. On the other hand, in the case where an aberration that occurs due to a tilt of the optical recording medium 8 is corrected using the scheme described above, it is possible to omit all of the members necessary for tilting the objective lens 7, whereby the downsizing of the optical head can be achieved. Still further, in the case where the foregoing scheme is used, only a coma occurs, unlike the case where the objective lens 7 is tilted. Therefore, it is possible to correct an aberration desirably.

Still further, JP 2001-84631 A also discloses the correction of an aberration using liquid crystal as a phase shifting layer, and an optical element disclosed by the foregoing publication has an ITO electrode whose area is not divided, which is advantageous for correcting an aberration.

Still further, in the first and second embodiments, a coma that occurs due to a tilt of the optical recording medium 8 is corrected by tilting the objective lens 7 so that the coma is minimized, and at the same time an aberration other than a coma (for instance, an astigmatism, a high-order aberration, etc.) is caused also by tilting the objective lens 7. Therefore, the correction may be performed by preliminarily determining a position at which a total aberration is minimized and referring to the position.

Still further, though a single lens is used as the objective lens 7 in the first and second embodiments, a pair lens having a high NA may be used.

Still further, though the first and second embodiments are described with reference to a case in which an infinite system optical head is used, the present invention can be applied also to a finite system optical head without using the collimator lens 2.

Still further, though the first and second embodiments are described with reference to a case in which an unpolarized type optical system optical head is used, the present invention can be applied also to a polarized type optical system optical head.

Still further, though the driving direction of the tilt-related-aberration correcting means 13 is not specified in the first and second embodiments, it is possible to correct either, or both of an aberration that occurs due to a tilt in a radial direction and an aberration that occurs due to a tilt in a tangential direction depending on, for instance, the direction in which the objective lens 7 is tilted. Further, in the case where an aberration that occurs due to a tilt of an optical recording medium is corrected using an optical element with a phase shifting layer, an aberration that occurs due to a tilt in the radial direction is corrected as shown in FIG. 7. However, by changing the pattern, an aberration that occurs due to a tilt in the tangential direction can be corrected. Still further, by combining two kinds of patterns, an aberration that occurs due to both of the tilts can be corrected also.

Still further, though the tilt sensor 11 is used as the tilt detecting means in the first and second embodiments, the tilting amount of the optical recording medium 8 may be detected using another scheme. As a tilt detecting means of another scheme, the scheme disclosed by JP 2000-348362 A, for instance, is known. In this scheme, a focus zero-crossing position that is a position at which light is brought into the best focus is detected by moving the objective lens in the optical axis direction, in an inner radius area and an outer radius area of the optical recording medium. Then, the tilting amount of the optical recording medium and the direction of the tilt are determined based on a difference between a value of a focus search voltage for detecting the focus zero-crossing position in the inner radius area of the optical recording medium and a value thereof in the outer radius area thereof. This configuration does not require a separately provided optical system for detecting a tilt of the optical recording medium, thereby making it possible to downsize the optical head. On the other hand, in the case of the configuration of the first or second embodiment in which the tilt sensor 11 is used as the tilt detecting means, which implies that an optical system separate from the optical system for recording and reproducing is used, a tilting amount of the optical recording medium 8 can be detected at the same time upon recording or reproducing.

Figure 9:
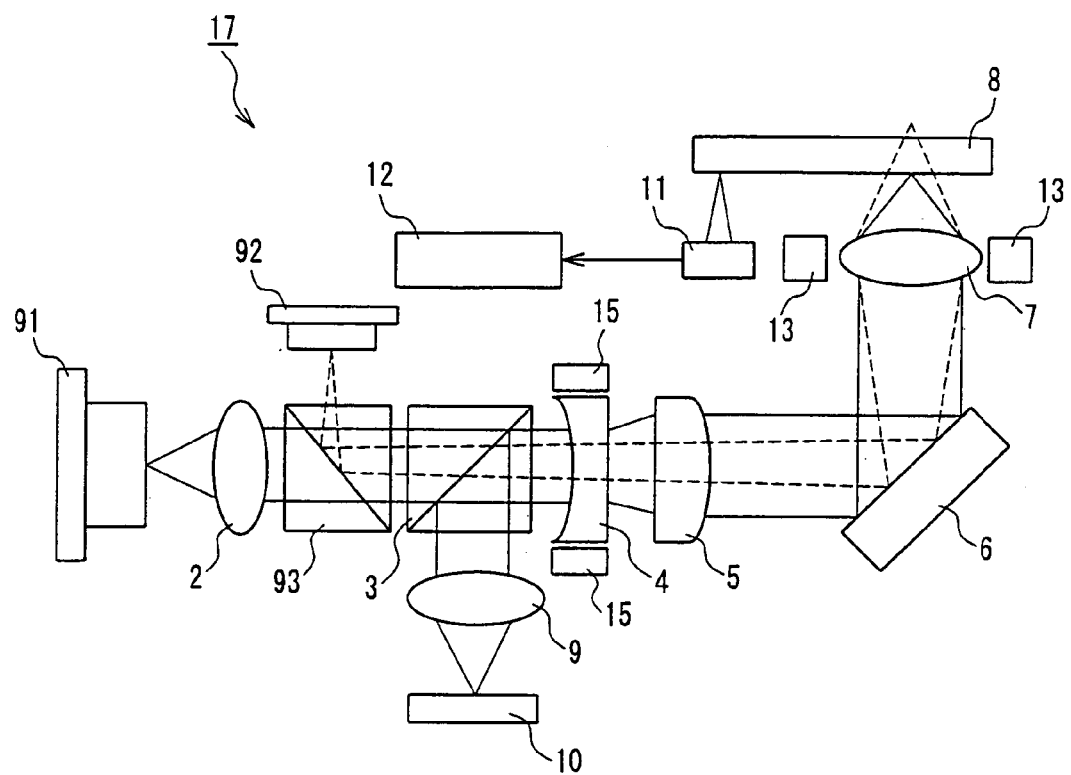
FIG. 9 is a schematic view illustrating another example of an optical head according to the second embodiment of the present invention.

Further, the present invention can be applied also to an optical head that carries out recording or reproducing with respect to optical recording media of different types. FIG. 9 schematically illustrates an optical head that carries out recording or reproducing with respect to optical recording media of different types.

In FIG. 9, 91 denotes a first light source, 92 denotes a second light source, and 93 denotes a wavelength selecting prism. The first light source 91 has a wavelength of 405 nm, and is intended to carry out recording or reproducing with respect to an optical recording medium 8 having a standard substrate thickness of 0.1 mm (an optical path of light emitted from the first light source 91 is indicated by solid lines in FIG. 9). The second light source 92 has a wavelength of 660 nm, and is intended to carry out recording or reproducing with respect to an optical recording medium 8 (DVD) having a standard substrate thickness of 0.6 mm (an optical path of light emitted from the second light source 92 is indicated by broken lines in FIG. 9). The configuration thereof other than the above is identical to that of the first embodiment. Therefore, herein the details of the present embodiment that are not specifically described are considered to be identical to those of the first embodiment described above, and the constituent members denoted with the same reference numerals as those in the first embodiment are considered to have the same functions as those of the first embodiment unless they are described specifically.

Next, an operation of an optical head 17 having the foregoing configuration is described with reference to FIG. 9.

Light emitted from the first light source 91 is focused by an objective lens 7 on a recording layer of the optical recording medium 8 in the same manner as that of the first embodiment. Light reflected by the optical recording medium 8 is focused by a focusing lens 9 on a photodetector 10. From the photodetector 10, a control signal and a reproduction signal are obtained.

Light emitted from the second light source 92 is reflected by the wavelength selecting prism 93, and thereafter, the reflected light is focused by the objective lens 7 on a recording layer of the optical recording medium 8 (DVD). Further, the light reflected by the optical recording medium 8 (DVD) is focused by the focusing lens 9 on the photodetector 10. From the photodetector 10, a control signal and a reproduction signal are obtained. It should be noted that light emitted from the second light source 92 is caused to enter the objective lens 7 while remaining divergent light, because a focal position thereof is different due to a difference in the substrate thickness, and so that a spherical aberration should be corrected.

Since substrates thereof have different thicknesses as described above, in the case where types of the optical recording media 8 are different, aberrations that occur due to tilts thereof are different even if the tilting amounts of the optical recording media 8 are equal to each other, and hence, tilted amounts of the objective lens 7 are different. Therefore, even if the tilting amounts of the optical recording media 8 are the same, stable recording can be performed while a stable control signal and a stable reproduction signal can be obtained, by varying the tilted amount set by the objective lens tilting means 13 according to the type of the optical recording medium 8.

Third Embodiment

Figure 10:
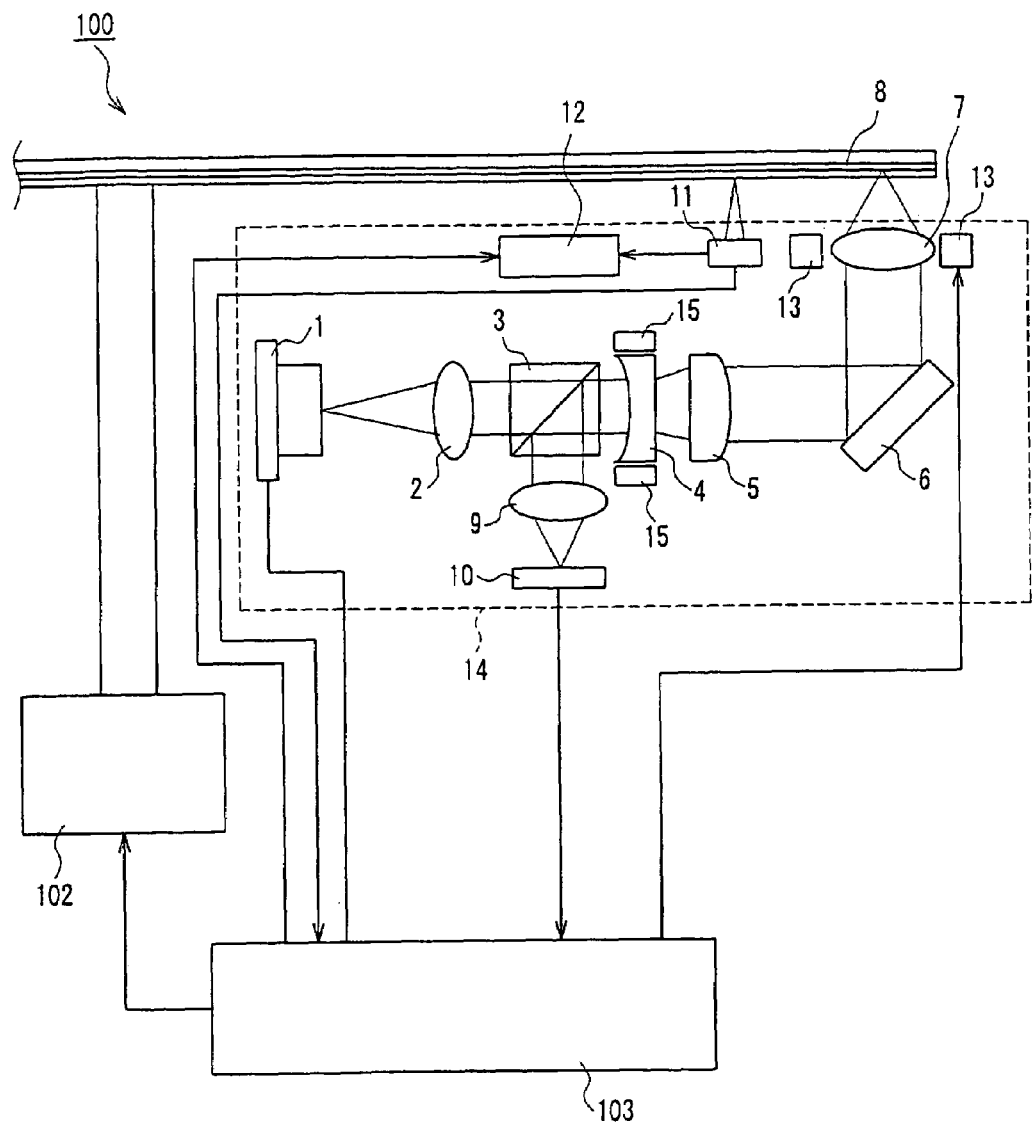
FIG. 10 is a schematic view illustrating an optical recording/reproducing device according to a third embodiment of the present invention.
Figure 11:
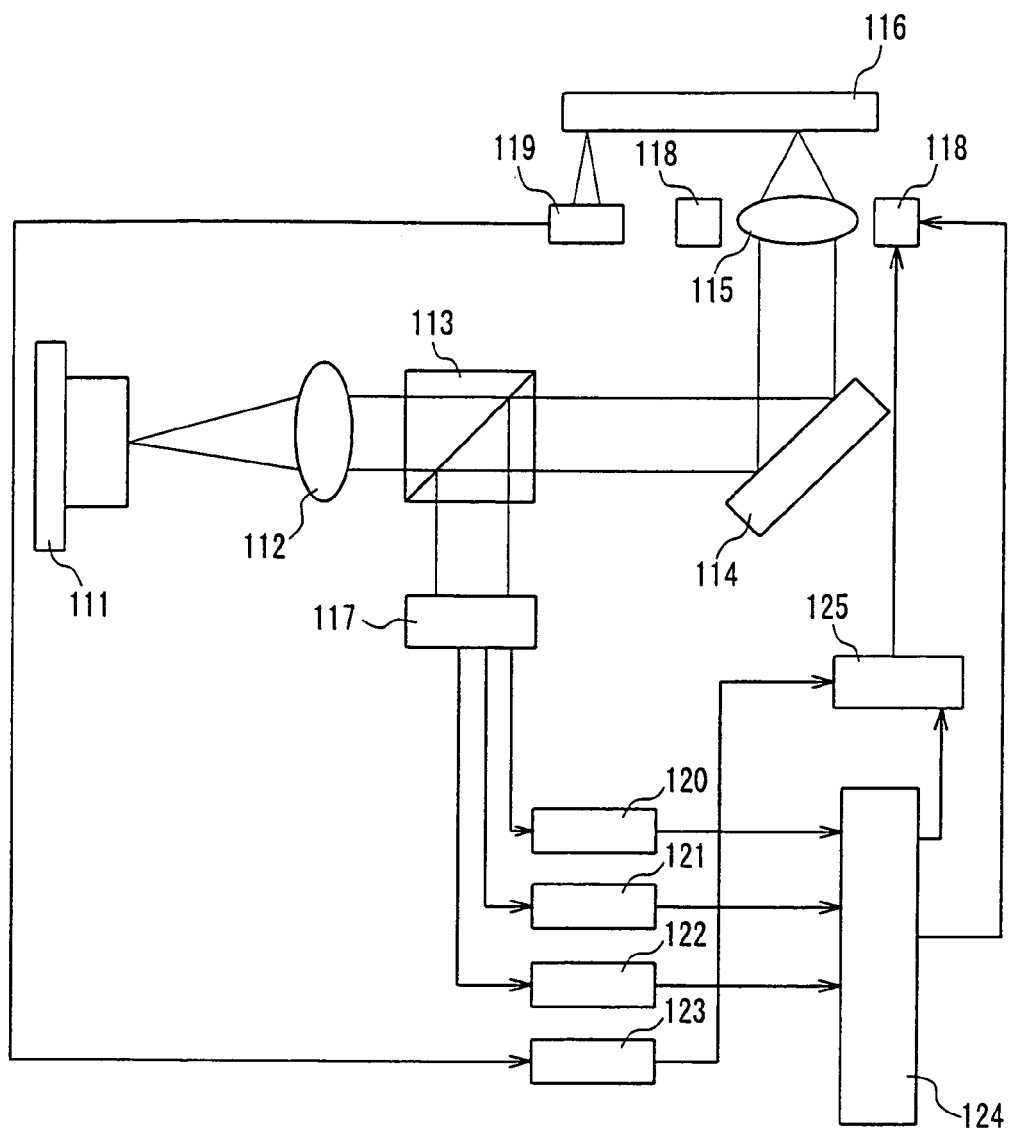
FIG. 11 is a schematic view illustrating a configuration of an optical head according to the prior art.

FIG. 10 is a view schematically illustrating an optical recording/reproducing device according to a third embodiment of the present invention.

The optical recording/reproducing device of the present embodiment is a device for recording and reproducing signals to and from a single-layer or multi-layer optical recording medium. As shown in FIG. 10, an optical recording/reproducing device 100 according to the present embodiment includes the optical head 14 of the first embodiment described above, a motor 102 for rotating the optical recording medium 8, and a processing circuit 103. Though the optical head of the first embodiment described above is used here, the optical head of the second embodiment described above may be used instead. Since the optical head is the same as that described in conjunction with the first embodiment, duplicate descriptions thereof are omitted.

Next, an operation of the optical recording/reproducing device 100 having the foregoing configuration is described with reference to FIG. 10.

First, when an optical recording medium 8 is set in the optical recording/reproducing device 100, the processing circuit 103 outputs a signal for rotating the motor 102, so as to rotate the motor 102. Then, the processing circuit 103 drives the light source 1 so as to emit light. The light emitted from the light source 1 is focused by an objective lens 7 on a recording layer of the optical recording medium 8, and light reflected by the optical recording medium 8 is focused by a focusing lens 9 on a photodetector 10. According to the focused light, the photodetector 10 feeds the processing circuit 3 with a focus error signal indicating a focused state of light on the recording layer of the optical recording medium 8 and a tracking error signal indicating a position at which light is projected thereon. The processing circuit 103 feeds the objective lens tilting means 13 with a signal for controlling the objective lens 7 according to the foregoing signals, thereby causing the light emitted from the light source 1 to be focused on a desired track on the optical recording medium 8. Further, the processing circuit 103 reproduces information recorded in the optical recording medium 8 according to signals outputted from the photodetector 10. Still further, the tilt sensor 11 detects a tilting amount of the optical recording medium 8, and a detection signal thus obtained is fed to the processing circuit 103. The processing circuit 103 determines the type of optical recording medium 8 subjected to a recording or reproducing operation, a single-layer medium or a multi-layer medium, and which layer is subjected to the operation in the case where it is a multi-layer medium. Then, the processing circuit 103 retrieves, from the memory 12, a tilted amount of the objective lens 7 necessary for correcting the tilting amount of the optical recording medium 8, and feeds the objective lens tilting means 13 with a signal for tilting the objective lens 7 through the necessary amount.

Since the optical head 14 of the first embodiment is used as the optical head as described above, an aberration occurring when the optical recording medium 8 tilts can be corrected precisely, irrespective of whether the optical recording medium 8 is single-layer or multi-layer, or which recording layer is subjected to an operation. Consequently, stable recording can be performed, while a stable control signal or a stable reproduction signal can be obtained.

Though the foregoing embodiment is described with reference to a case in which a two-layer optical recording medium is used as a multi-layer optical recording medium, an excellent effect can be achieved particularly in the case where the present invention is applied to a multi-layer optical recording medium having more than two layers, since such a multi-layer optical recording medium has a greater substrate thickness.

Still further, though the foregoing embodiment is described with reference to a case in which an optical recording medium in which information is recorded using only light is used, an identical effect can be achieved also in the case of an optical recording medium in which information is recorded using light and magnetism.

Still further, though the foregoing embodiment is described with reference to a case where the optical recording medium is an optical disk, an identical effect as that in the case where an optical disk is used can be achieved also in the case where an optical card is used instead of an optical disk.

The invention claimed is:

1. An optical head for recording a signal in an optical recording medium or reproducing a signal recorded in the optical recording medium, the optical head comprising:
   a light source;
   an objective lens for focusing light emitted from the light source on the optical recording medium;
   a tilt-related-aberration correcting means for correcting an aberration that occurs when the optical recording medium tilts; and
   a driving amount determining means for determining a driving amount necessary for the tilt-related-aberration correcting means,
   wherein the tilt-related-aberration correcting means is a means for tilting the objective lens which is provided with the driving amount determined by the driving amount determining means according to information concerning a tilt of the optical recording medium and information concerning a substrate thickness of the optical recording medium;
   the objective lens has a certain set numerical aperture (NA), and
   a tilted amount of the objective lens is varied according to the substrate thickness of the optical recording medium.

2. The optical head according to claim 1, wherein the objective lens has a NA of not less than 0.7.

3. The optical head according to claim 1, wherein the driving amount determining means is a memory in which information concerning the driving amount for the tilt-related-aberration correcting means that is necessary for correcting an aberration that occurs due to a tilt of the optical recording medium is stored, the driving amount being determined according to the information concerning the tilt of the optical recording medium and the information concerning the substrate thickness of the optical recording medium.

4. The optical head according to claim 1, further comprising a tilt detecting means for detecting information concerning the tilt of the optical recording medium.

5. The optical head according to claim 4, wherein the tilt detecting means comprises:
   a second light source different from said light source;
   a focusing lens for focusing light emitted from the second light source on the optical recording medium; and
   a photodetector for detecting light reflected by the optical recording medium.

6. The optical head according to claim 4, wherein the tilt detecting means detects focus zero-crossing positions at two certain points in a radial direction of the optical recording medium, and detects a tilting amount of the optical recording medium based on a difference between values of a focus search voltage at the two points, the focus search voltage being a voltage for detecting the focus zero-crossing position.

7. The optical head according to claim 1, further comprising a memory in which information concerning the substrate thickness of the optical recording medium is stored.

8. The optical head according to claim 1, further comprising a substrate thickness detecting means for detecting information concerning the substrate thickness of the optical recording medium.

9. The optical head according to claim 8, wherein the substrate thickness detecting means comprises:
   a second light source different from said light source;
   a focusing lens for focusing light emitted from the second light source on the optical recording medium; and
   a photodetector for detecting light reflected by the optical recording medium.

10. The optical head according to claim 8, wherein the substrate thickness detecting means detects the information concerning the substrate thickness of the optical recording medium according to focal positions of two light beams, the two light beams being a first light beam on a side closer to an optical axis and a second light beam on an external side as compared with the first light beam.

11. The optical head according to claim 1, wherein the tilt-related-aberration correcting means is formed with an optical element, the optical element comprising a pair of substrates having transparent conductive thin films, respectively, and a phase shifting layer interposed between the pair of substrates, and a pattern capable of correcting an aberration that occurs due to the tilt of the optical recording medium is formed on one of the conductive thin films.

12. The optical head according to claim 1, further comprising a substrate-thickness-related-aberration correcting means for correcting an aberration that occurs due to a deviation of the substrate thickness of the optical recording medium from a standard value of the substrate thickness.

13. The optical head according to claim 12, wherein the substrate-thickness-related-aberration correcting means comprises:

a positive lens group and a negative lens group disposed in an optical path; and a means for varying a lens distance between the positive lens group and the negative lens group.

14. The optical head according to claim 12, wherein the substrate-thickness-related-aberration correcting means is formed with an optical element, the optical element comprising a pair of substrates having transparent conductive thin films, respectively, and a phase shifting layer interposed between the pair of substrates, and a pattern capable of correcting an aberration that occurs relating to the substrate thickness of the optical recording medium is formed on one of the conductive thin films.

15. The optical head according to claim 12, wherein the tilt-related-aberration correcting means and the substrate-thickness-related-aberration correcting means are formed with one optical element, the optical element comprising a pair of substrates having transparent conductive thin films, respectively, and a phase shifting layer interposed between the pair of substrates, and a pattern capable of correcting an aberration that occurs relating to the substrate thickness of the optical recording medium is formed on one of the conductive thin films, and a pattern capable of correcting an aberration tat occurs due to the tilt of the optical recording medium is formed on the other conductive thin film.

16. The optical head according to claim 11, wherein the phase shifting layer is made of liquid crystal.

17. An optical recording/reproducing device comprising an optical head for recording a signal in an optical recording medium or reproducing a signal recorded in the optical recording medium, wherein the optical head is the optical head according claim 1.

18. An aberration correcting method for correcting an aberration that occurs when an optical recording medium tilts, by using an optical head for recording a signal in the optical recording medium or reproducing a signal recorded in the optical recording medium, the optical head comprising:

a light source;

an objective lens for focusing light emitted from the light source on the optical recording medium, wherein the objective lens has a certain set numerical aperture (NA);

a tilt-related-aberration correcting means comprising:

a means for tilting the objective lens for correcting an aberration that occurs when the optical recording medium tilts and according to the substrate thickness of the optical recording medium, and a driving amount determining means for determining a driving amount necessary for the tilt-related-aberration correcting means, the method comprising the step of providing the tilt-related-aberration correcting means with the driving amount determined by the driving amount determining means according to information concerning a tilt of the optical recording medium and information concerning a substrate thickness of the optical recording medium.

* * * * *

UNITED STATES PATENT AND TRADEMARK OFFICE
CERTIFICATE OF CORRECTION

| | | |
|---|---|---|
| PATENT NO. | : 7,164,638 B2 | Page 1 of 1 |
| APPLICATION NO. | : 10/502242 | |
| DATED | : January 16, 2007 | |
| INVENTOR(S) | : Wada et al. | |

It is certified that error appears in the above-identified patent and that said Letters Patent is hereby corrected as shown below:

On Title Page Item 56
Page 2, second column, line 5: "2000-34862" should read --2000-348362--.
Column 20, line 4(claim 1): "medium; " should read --medium, --.
Column 22, line 1(claim 15): "tat" should read --that--.
Column 22, line 11(claim 17): "according " should read --according to--.

Signed and Sealed this

Sixteenth Day of October, 2007

JON W. DUDAS
*Director of the United States Patent and Trademark Office*